United States Patent [19]

Petrick et al.

[11] Patent Number: 4,646,355

[45] Date of Patent: Feb. 24, 1987

[54] METHOD AND APPARATUS FOR INPUT PICTURE ENHANCEMENT BY REMOVAL OF UNDERSIRED DOTS AND VOIDS

[75] Inventors: Bruce E. Petrick, Lake Oswego; Perry E. Wingfield, Tigard, both of Oreg.

[73] Assignee: Tektronix, Inc., Beaverton, Oreg.

[21] Appl. No.: 712,306

[22] Filed: Mar. 15, 1985

[51] Int. Cl.[4] .......................... G06K 9/40; H04N 1/40
[52] U.S. Cl. ...................................... 382/54; 382/49; 358/284
[58] Field of Search ....................... 382/54, 50, 27, 41, 382/49; 358/166, 167, 284, 282

[56] References Cited

U.S. PATENT DOCUMENTS

| | | | |
|---|---|---|---|
| 4,464,789 | 8/1984 | Sternberg | 382/49 |
| 4,506,382 | 3/1985 | Hada | 382/54 |
| 4,510,616 | 4/1985 | Lougheed | 382/41 |
| 4,510,618 | 4/1985 | Ataman et al. | 382/54 |
| 4,589,140 | 5/1986 | Bishop | 382/27 |

FOREIGN PATENT DOCUMENTS 53-41404 10/1979 Japan ................................. 358/284

*Primary Examiner*—Leo H. Boudreau
*Assistant Examiner*—A. Anne Skinner
*Attorney, Agent, or Firm*—Allston L. Jones; Robert S. Hulse

[57] ABSTRACT

A method and apparatus for removing undesirable dots and voids which are smaller than the user defined smallest data item of a bit-map image of a picture being scanned by a picture coding system. The bit-map is delayed as it is being generated to form a series of tessellations or windows of data of selected sizes. The windows are propagated through a series of neighborhood-logic elements which with the output data level of the outer ring of neighborhood-logic elements which define the window being examined to determine if those data levels are all of the same sense. If they are all of the same sense, then all of the neighborhood-logic elements which define the interior of the window are set or cleared so that the output data levels of all of the neighborhood-logic elements which define the window are of the same sense.

7 Claims, 8 Drawing Figures

METHOD AND APPARATUS FOR INPUT
PICTURE ENHANCEMENT BY REMOVAL OF
UNDERSIRED DOTS AND VOIDS

CROSS REFERENCE

This application is related to two other applications assigned to the same assignee as the present invention. Those applications are "Method of Pixel to Vector Conversion in an Automatic Picture Coding System" having ser. no. 624,434 and filed on June 24, 1984, and "Method and Apparatus for Forming 3×3 Pixel Arrays and for Performing Programable Pattern Contingent Modifications of Those Arrays" by the same inventors as the present application, having been filed on or about the same day as the present invention, and designated by the assigneee as application PF3716.

BACKGROUND OF THE INVENTION

This invention relates to the inputting of a picture into a data base. More particularly, the invention relates to a method and apparatus for the enhancement of a picture by the removal and filling of dots and voids, respectively, which are too small to be actual information in the picture as it is being read into a data base.

Computer-aided design and drafting is practiced extensively in the engineering and graphic arts; however, there exists an extensive archive of documents generated manually or otherwise in pictorial form, i.e., more suitable for human interpretation than interpretation by machine. The demand for conversion of such archives to machine script will grow as the transition to computer-based graphics progresses and becomes more complete.

Techniques for automatically converting drawings and other pictures to machine script for processing, storage or display are well known. One of the most efficient and compact machine-script data sets representative of a picture comprises vectors including data items representing spatial location of the vectors with respect to the original picture. Generally techniques for converting a picture into such vectorial data fall into two categories, viz.: line-following and raster-to-vector conversion. Line-following schemes, while generating vectorial data directly, require large and expensive assemblies that are best suited for high production environments. Line-following is said to be advantageous because the original picture is used as the image memory, instead of a bit-map copy of the picture in the computer memory. A "bit-map" is a signal set in machine script representing a tessellation of small picture elements or pixels of the original document. Generally, line-following imaging systems having devices that can be directed randomly in two dimensions to detect and follow picture features are either expensive or slow. An example of the former comprises a device utilizing a scanning laser beam which is directed by moving mirrors, and having acoustooptical devices for detecting features of the picture. An example of the latter is an electromechanical device such as a plotter having a light sensor instead of a pen. In some implementations, an operator manually guides a carriage along a line to be acquired; a photosensor detects when the carriage is directly over a line and enables the system to store X and Y coordinates of the carriage. by moving the carriage on an irregular path over the line, the intersections of the path and the line are stored as end points of a string of vectors. A totally automatic line-following system must first scan the entire picture to locate lines and features, and maintain a data-storage bookkeeping system to preclude duplicate storage of data. Otherwise, an operator must locate lines and direct the process, line by line.

In raster-to-vector conversion systems, the original picture or its microfilm is scanned, e.g., optically, and the information thereon resolved into a bit-map. The optical characteristics of each pixel are used to control detection circuits that generate positionally defined signals of the bit-map. An advantage of raster-to-vector conversion systems is that raster-scan imaging devices are inexpensive and prevalent; however, this kind of system has commonly required storage of the entire image as a bit-map in a data store accessible by a computer, the computer then executing a program for converting the bit-map to a vectorial data set.

The storage of a bit-map copy of a picture requires a large data store. For example, a bit stream acquired from raster scanning an E-size drawing with a resolution of 0.1 millimeter comprises approximately 100 million bits of data. A "bit stream" means a sequence of electrical signals or pulses comprising a set of binary digits representing data in coded form wherein the significance of each bit is determined by its position in the sequence and its relation to other bits. Various data reduction algorithms based on information and coding theory have been utilized to achieve significant reduction in the storage requirement for scanned data. Unfortunately, however, the form of representation of data as coded messages generally lacks information necessary for reconstituting regular line drawings.

A video imaging system with a resolution of 0.1 millimeters will detect drawing artifacts that are not intended to be part of the drawing. These artifacts may be dots or voids which are smaller than the smallest feature size of the drawing. A method of removal of these types of artifacts could be particularly helpful when a picture which includes half toning is being input into a data base. Such a picture which has been digitized by an image acquistion stage, where the gray scale is removed and each pixel equivalent of the picture is given a value of 0 (white) or 1 (black), may have stray black dots or voids in black regions. Other stray marks, such as flaws in the medium containing the drawing or stray pencil marks, etc., need to be removed to prevent their unnecessary storage in the data base.

It would be desirable to have a method for removing extraneous dots and voids which is not software intensive and can be used independent of more expensive and software intensive line thinning techniques which do not always successfully remove the undesirable dots and voids. The present invention provides such a method and apparatus.

SUMMARY OF THE INVENTION

In accordance with the illustrated embodiment, the present invention provides a method and apparatus for removing undesirable dots and voids which are smaller than the user defined smallest data item of a bit-map image of a picture being scanned by a picture coding system. The bit-map is delayed as it is being generated to form a series of tessellations or windows of data of selected sizes. The windows are propagated through a series of neighborhood-logic elements with the output data level of the outer ring of neighborhood-logic elements being examined to determine if those data levels are all of the same sense. If they are all of the same sense, then all of the neighborhood-logic elements which define the interior of the window are set or cleared so that the output data levels of all of the neighborhood-logic elements which define the window are of the same sense.

DESCRIPTION OF THE DRAWINGS

A full understanding of the present invention will be obtained from a detailed description given hereinbelow and the accompanying drawings. In addition, the drawings are given by way of illustration only, and thus are not limitative of the present invention. Further, wherein.

DESCRIPTION OF THE PREFERRED EMBODIMENT

Figure 1:
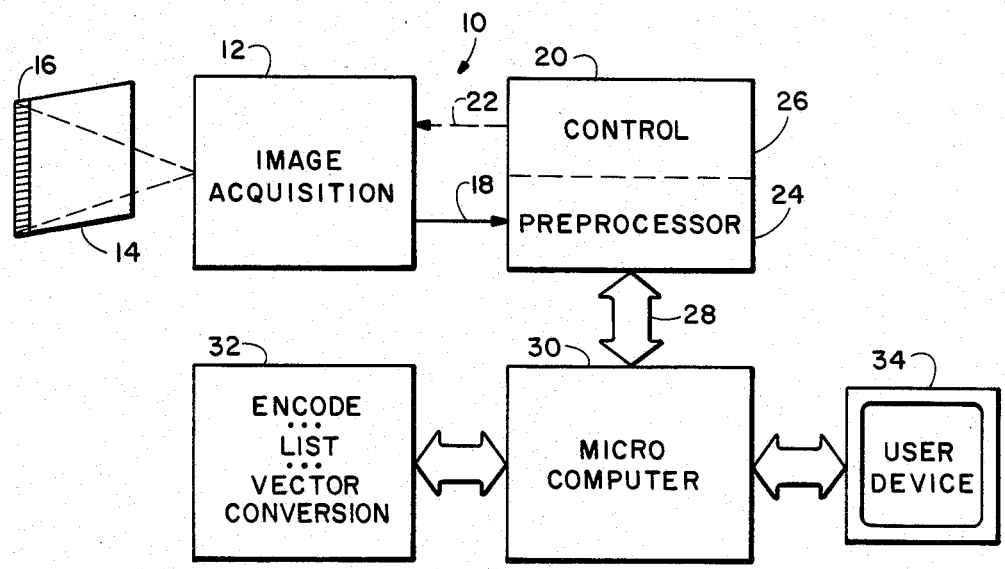
FIG. 1 is a block diagram of an automatic picture coding system in accordance with the instant invention.

FIG. 1 shows a simplified block diagram of an automatic picture coding system 10 of the first reference cross-referenced above. That picture coding system comprises an image acquisition element 12 which converts an image of a document 14 into electrical signals. A variety of means may be utilized to acquire an image of a document including scanners wherein the document to be read is moved past a fixed sensor and light source. An example is the facsimile drum scanner in which the original is attached to the outside of a rapidly rotating cylinder moving slowly along its axis with respect to the sensor, thus producing a raster-scanned image of the document. In a variation of the foregoing, the original document and the detector remain fixed and the scanning is effected by moving mirrors. A second type of scanner is one in which a small intense spot of light is scanned over a document, light reflected from the document being detected by a single-element detector with no particular directional characteristics. Such scanners include laser scanners having moving mirrors which scan a laser spot across the picture. A moving spot may also be produced by focusing the face of a raster-scanned CRT onto the document. Another scanning approach involves scanning the document or an optical image of the document, with an area detector such as a vidicon or a solid-state imaging array.

The image acquisition element 12 of system 10 utilizes a form of raster scanning to dissect an optical image of the document 14 into a plurality of columns of square picture elements or pixels, one of which columns 16 is depicted in FIG. 1. A linear array of photosensitive charge-coupled devices (CCD) senses one entire column 16 of contiguous pixels of the appropriately illuminated document 14. The light intensity in each pixel is compared with a threshold value and converted to a binary digital signal representing either a black or a white area of the document 14. The electrical signals representing the column 16 are coupled via a connection 18 to a digital hardware element 20. The entire document 14 is scanned by successively repositioning the linear CCD imaging array in the direction perpendicular to the column 16 by mechanical means 22 responsive to the digital hardware element 20. The result is a digital image in the form of a serial matrix or bit-map having elements representing the entire document 14.

The digital hardware element 20 comprises a preprocessor 24 and a control logic element 26. The preprocessor 24 receives the serial digitized data from the image acquisition element 12 and performs a series of high-speed transformations on the data as it is received. The preprocessor 24 changes the data from a bit-map representation of the sensed image into a compact feature representation by performing selected preprocessing operations such as smoothing, growing, thinning, removing dots and voids, etc. Smoothing is a process which removes spurious points adjacent to a line, growing fills discontinuities in lines and broad features, and thinning reduces broad features to skeletal lines usually no more than one pixel wide. The transformed data is transferred via a bus 28 to a microcomputer 30 for additional, high-level processing. The data output from the preprocessor 24 to the microcomputer 30 is still a bit-map representation of the document 14; however, only pixels associated with line data and edges are output to the microcomputer 30. The data is transferred in real time as the document 14 is being scanned. The microcomputer 30, under control of a software module 32, encodes and lists the data, and converts the listed data into an abstraction comprising a list of vectors representing the original document. When the image of the document 14 has been thus encoded as vectors, the data can be easily edited, displayed and stored, or otherwise processed by a user device 34.

The control logic 26 serves as an interface between the microcomputer 30, the preprocessor 24, and the image acquisition element 12, providing control, sequencing and timing functions. Among these functions are control of the mechanical means 22 for scanning the imaging array as well as data transfer functions.

Figure 2:
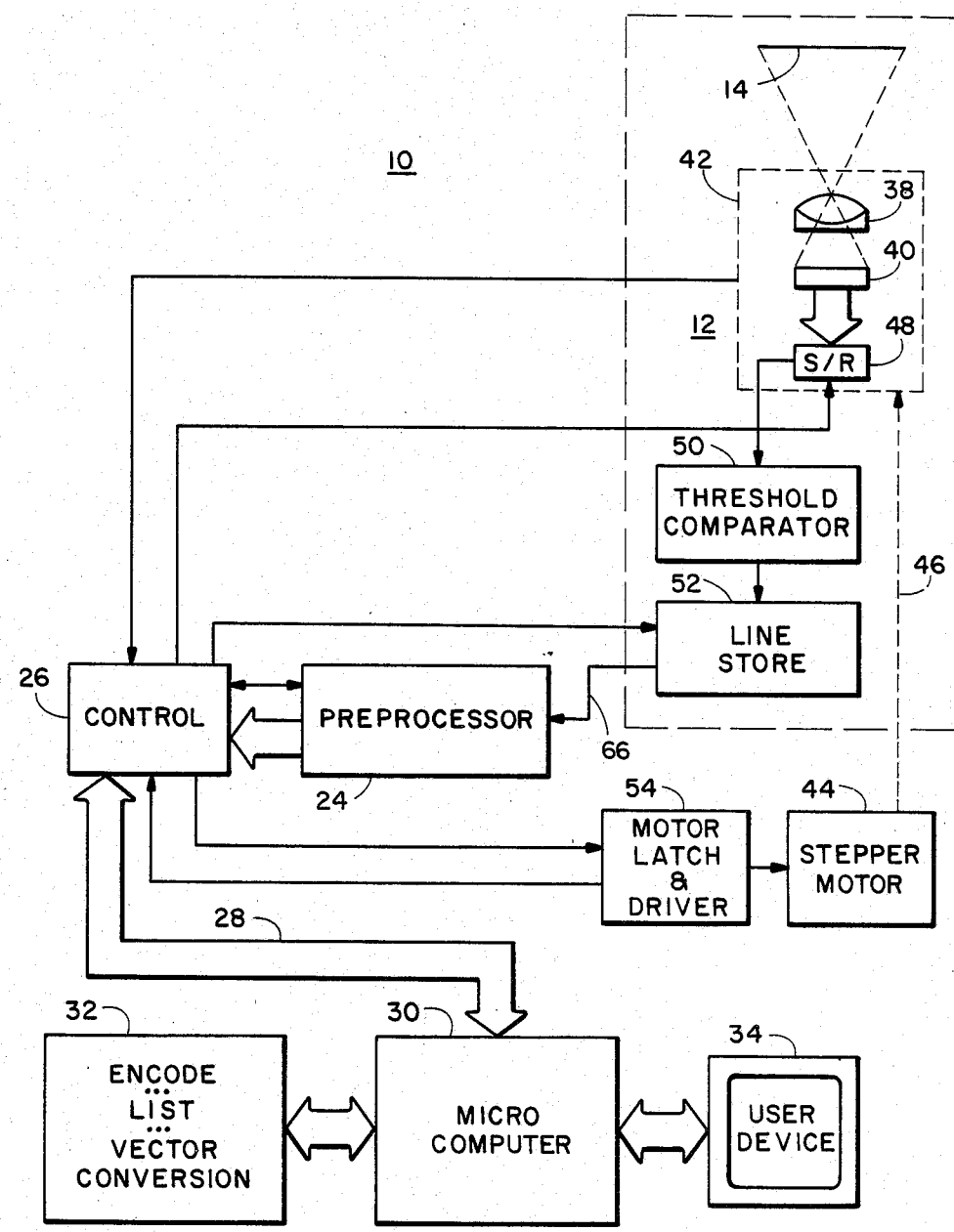
FIG. 2 is a more detailed block diagram of the system of FIG. 1.

Referring now to FIG. 2, the automatic picture coding system 10 of FIG. 1, is shown in greater detail. The image acquisition element 12 comprises a lens 38, and an image detector 40. Document 14 is mounted on a rotating drum and one column of the document is focused onto the image detector 40 which, for illustrative purposes, is shown as a linear CCD photodiode array having N photosensitive elements receiving photons from the column 16. N is a number that when divided into the greatest number of pixels possible around the circumference of the drum produces an integer result. Alternatively, the CCD photodiode array may scan a plurality of columns along the axis of the drum and store this data for the entire circumference of the drum. The lens 38 and image detector 40 are mounted on a carriage 42 which is connected to a stepper motor 44 by mechanical means 46. The charge is transferred from the photodiodes to a CCD analog shift register 48. After the transfer, the photodiodes 40 once again begin integrating light while the sensed charge pattern is shifted through the CCD analog shift register 48 to a threshold comparator 50. Each of the output voltages of the charge-pattern sequence representing the light striking each of the photodiodes in sequence along the array 40 is compared to a predetermined threshold voltage in the threshold comparator 50 and regenerated as a binary signal representative of the light/dark pattern of the sensed line wherein a binary "one" represents a black or dark area and "zero" represents a white or light area. A column or line of data sensed by the CCD array 40 is referred to herein as a "raster" of data, or simply, a raster. The image data from the CCD photodiode array is stored in a line store 52.

New data is acquired by the image detector 40 while the previous image is being shifted out of the CCD shift register 48 into the line store 52. Thus, the stepper motor 44 is activated to begin moving the carriage 42 immediately after the transfer of the data from the photodiode array 40 into the CCD shift register 48. The image detector 40 is moved on the carriage 42 which in the presently described embodiment is a micrometer driven translation stage, the micrometer 46 being turned by the stepper motor 44. The use of a stepper motor allows precise positioning of the array over a number of steps and allows the array 40 to be stepped intermittently precluding problems due to mechanical inertia. The stepper motor 44 is driven by motor latch and driver circuit 54 in response to input signals from the system software.

A raster of data stored in the line store 52 is transferred one bit at a time on demand to the preprocessor or window processor 24 under control of the control logic 26, and while this transfer is occurring, another raster of data is being acquired by the image acquisition element 12. The window processor 24 thus processes successive rasters of data as they are acquired utilizing a technique known in the art as "neighborhood" or window logic. Neighborhood logic refers to an operation performed digitally on a array of data A(I,J) which is carried out so as to transform A(I,J) into a new data array A'(I,J) wherein each element in the new array has a value determined only by the corresponding element in the original array along with the values of its nearest neighbors. The nearest neighbor configuration is called a "window" and apparatus performing operations on arrays of identically configured windows is called window logic.

Figure 3:
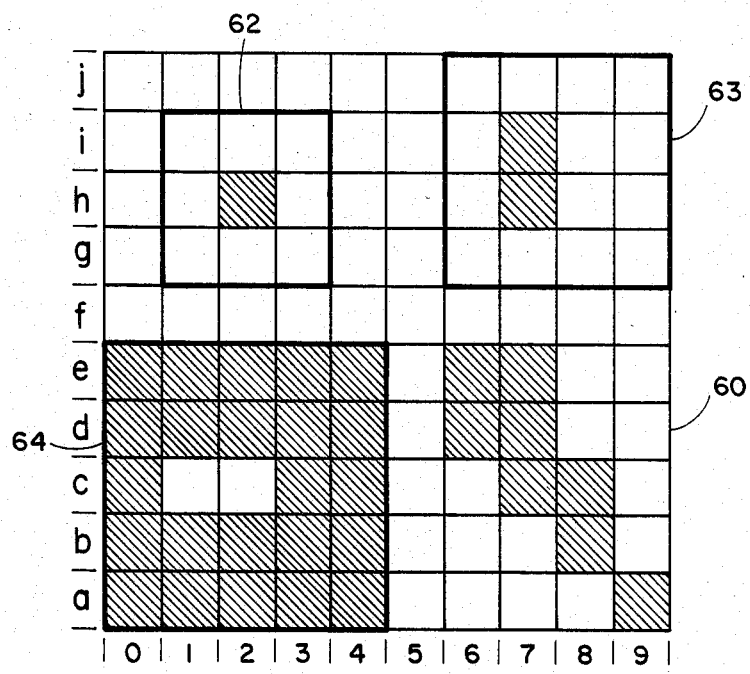
FIG. 3 illustrates a data format utilized in the practice of the present invention.

Referring to FIG. 3, there is shown a bit-map 60 of black and white pixels of sampled data representing a portion of a scanned document with successive raster portions being arranged vertically in the figure. A 3-pixel wide by 3-pixel high section of bit-map 60 is defined as a window 62. Similarly, a 4-pixel wide by 4-pixel high section is defined as window 63 and a 5-pixel wide by a 5-pixel high section is defined as window 64. Although each of the windows describe and shown here are square tessellations, other tesselations wherein the outermost pixels surround at least one interior pixel may be utilized.

In the present invention, preprocessor 24 examines the selected sized windows based on the user designation of the smallest data element in the document being entered into the data base. The smallest sized element will usually be a period which may, for example, be on the order of 7×7 pixels in size. Thus, the present invention will then be utilized to isolate and remove all spot sizes which are smaller than the selected minimum size. The present invention also automatically fills in any voids which are smaller than the selected minimum data element size which are also surrounded by black pixels.

This is accomplished by using successively larger windows, like those of FIG. 3, and, based on the pattern of light (0) and dark (1) pixels within the window, changing the data value (0 or 1) of all interior pixels to the same data value of the outermost pixels of the window when all the window outermost pixels have the same data value.

To illustrate the method of the present invention, assume that the smalest element to be recognized when entering the document into the data base is 5-pixels by 5-pixels in size. Window 62, which is 3-pixels by 3-pixels, would be considered by preprocessor 24 and the data value of pixel h2 would be changed from 1 to 0 to agree with the data value of each of surrounding pixels g1-g3, h1, h3, and i1-i3. Note, that if the data values of each of the pixels in window 62 were the opposite of that shown, the data value of pixel h2 would be changed from 0 to 1. Next, window 63 is 4-pixels by 4-pixels, and the data value of pixels h7, h8, i7 and i8 would be made to agree with the data value of pixels g6-g9, h6, h9, i6, i9, and j6-j9, however, since pixels h8 and i8 already have a data value which agrees with the outermost ring of pixels in the window, the data values of only pixels h7 and i7 will be changed to 0. Window 64 is 5-pixels by 5-pixels with each of the pixels in its outer ring being black (data value 1), thus each of the pixels in the center of this window should also be black. Pixels c1 and c2, therefore, will be changed to black. Since in our assumption above the minimum sized valid element in the drawings was selected to be 5×5 pixels, 5×5 is the largest window that is to be used. If a larger window were used, then valid drawing elements may be lost as that drawing is entered into the data base.

Before leaving FIG. 3, the reader's attention is directed to the lower right corner of bit-map 60 where there is shown a portion of the drawing of document 14. It can be seen that the smallest window of the present invention that could be used wherein all of the outer ring of pixels would be of the same color or data value would be 6×7 pixels. Thus, if 5×5 pixels was selected as the smallest size of meaningful data in document 14, the present invention would not produce any changes in this portion of the data.

Above in the discussion of FIGS. 1 and 2 it was stated that preprocessor 24 could perform a number of operations on the digitized information from document 14. If preprocessor 24 has the capability to, and the user has selected to, use the option of the present invention, it should be utilized to preprocess the data before any smoothing or thinning operations to avoid changes being made to the smoothed or thinned data.

Figure 4:
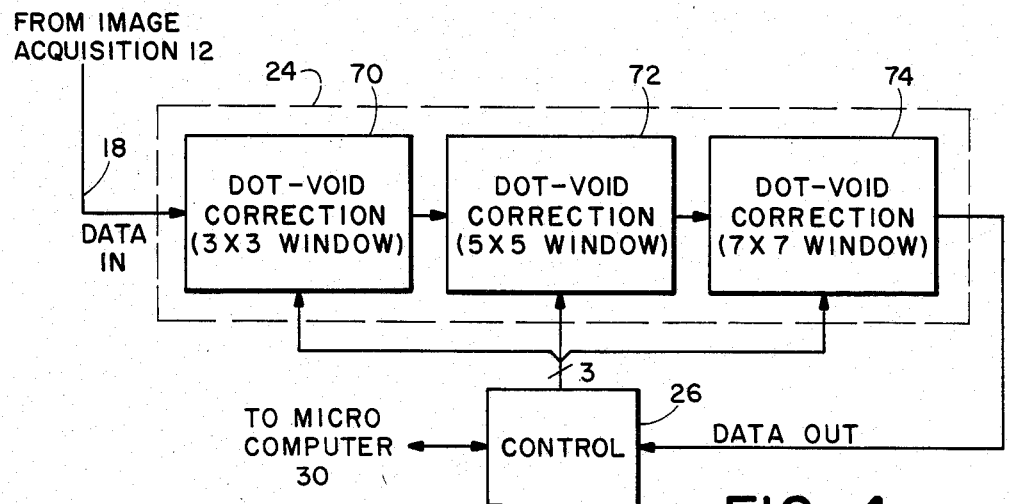
FIG. 4 shows a block diagram of the circuit of the present invention.

FIGS. 4-7 show the various details of the preferred embodiment to implement the dot and void removal from the data stream as discussed with respect to FIG. 3. FIG. 4 shows a cascade of three dot-void correction circuits 70, 72, and 74 in block form, a 3×3 window, a 5×5 window and a 7×7 window, respectively. Each of these circuits is indirectly user selectable via microcomputer 30 when the user defines the minimum size of smallest data item in the drawing to be entered into the data base. If that size is greater than or equal to 7-pixels by 7-pixels, then all three of correction circuits 70, 72, and 74 will be enabled via control 26; if it is 5-pixels by 5-pixels, then only circuits 70 and 72 will be enabled; and so forth. While only three dot-void correction circuit blocks are shown in FIG. 4, it should be understood that additional sized circuits could also have been included, however, these three were selected to accomodate the minimum sizes of useful data on nearly all drawings, as well as to minimize parts count, space-power requirements and overall signal processing time.

Figure 5:
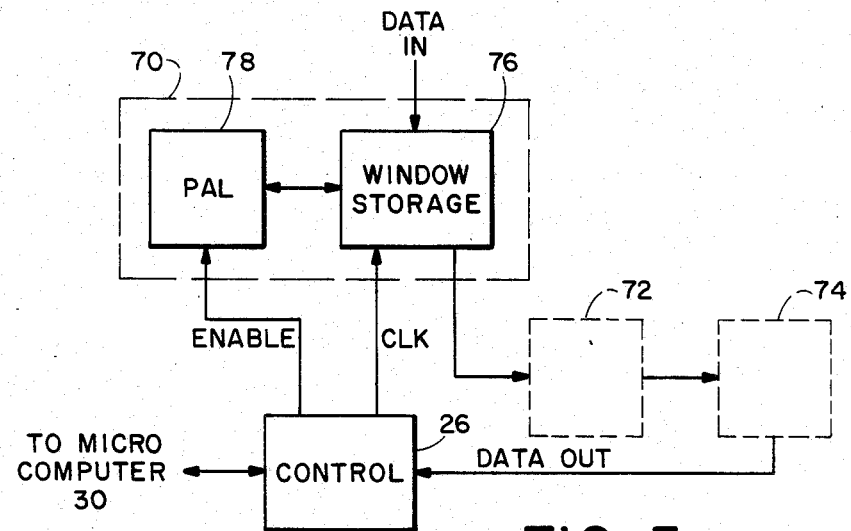
FIG. 5 shows a block diagram of one of the dot-void correction circuits of FIG. 4.
Figure 6:
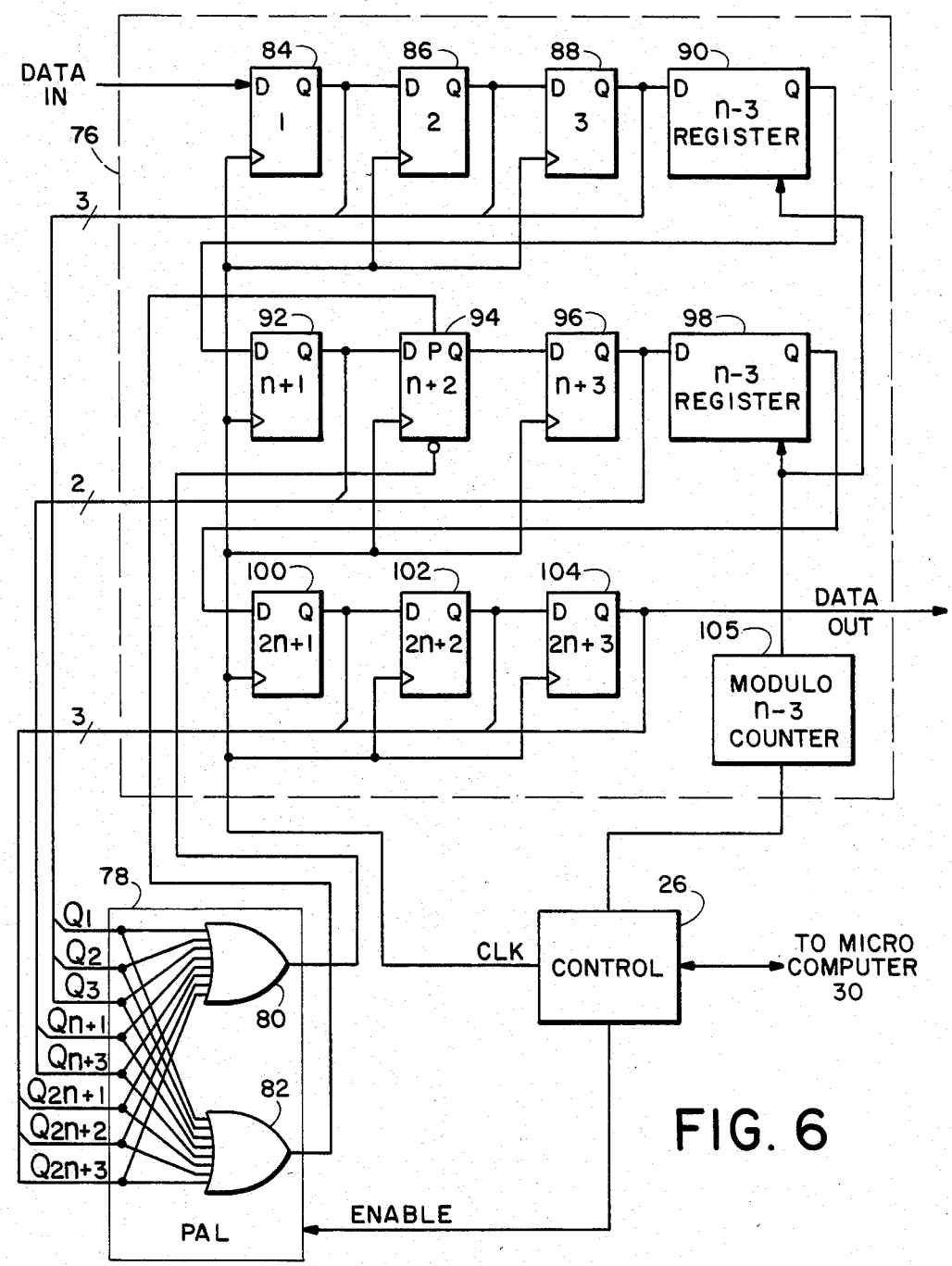
FIG. 6 shows a block diagram of a 3×3 dot-void correction circuit of FIG. 4.

Referring next to FIG. 5, there is shown a block diagram wherein a representative one of the dot-void correction circuits, namely the 3×3 window circuit 70, is shown as including a window storage unit 76 and a PAL (programmable array logic) 78 under the control of control block 26. FIG. 6 carries the details of FIG. 5 one step further in that it illustrates the details of PAL 78 and window storage unit 76. Window storage unit 76 is shown having a serial, or cascaded, arrangement of nine D flip-flops 84–88, 92–96 and 100–104, two (n−3) bit variable length D triggered registers 90 and 98, and a modulo (n−3) counter 106. The D flip-flops and (n−3) registers are cascaded with flip-flops 84–88, followed by register 90, then followed by flip-flops 92–98, then register 98, and finally flip-flops 100–104. Modulo (n−3) counter 106 controls the length of registers 90 and 98. Control 26 provides the clock signal for each of the flip-flops. Here it should be noted that n is the number of pixel unit spaces in a column of the drawing when read by image acquisition 12. In addition, PAL 78 is shown having been programmed to function as both an eight input terminal OR gate 80 and an eight input terminal AND gate 82. Each of the equivalent AND and OR gate 80 and 82 receive as input signals the Q output signals from flip-flops 84–88, 92, 96 and 100–104, the outermost ring of flip-flops. The output signals from the equivalent OR and AND gates 80 and 82 are coupled to the clear and preset terminals, respectively, of the center flip-flop 94. As discussed earlier with respect to FIG. 3, if the Q output signal of each of the outer ring of flip-flops is 0, OR gate 80 clears flip-flop 94 so that its Q output value is 0. Similarly, if the Q output signal of each of the outer ring of flip-flops is 1, AND gate 81 sets flip-flop 94 so that its Q output value is 1. Each of these changes only occur if PAL 78 is enabled by the user.

Figure 7A:
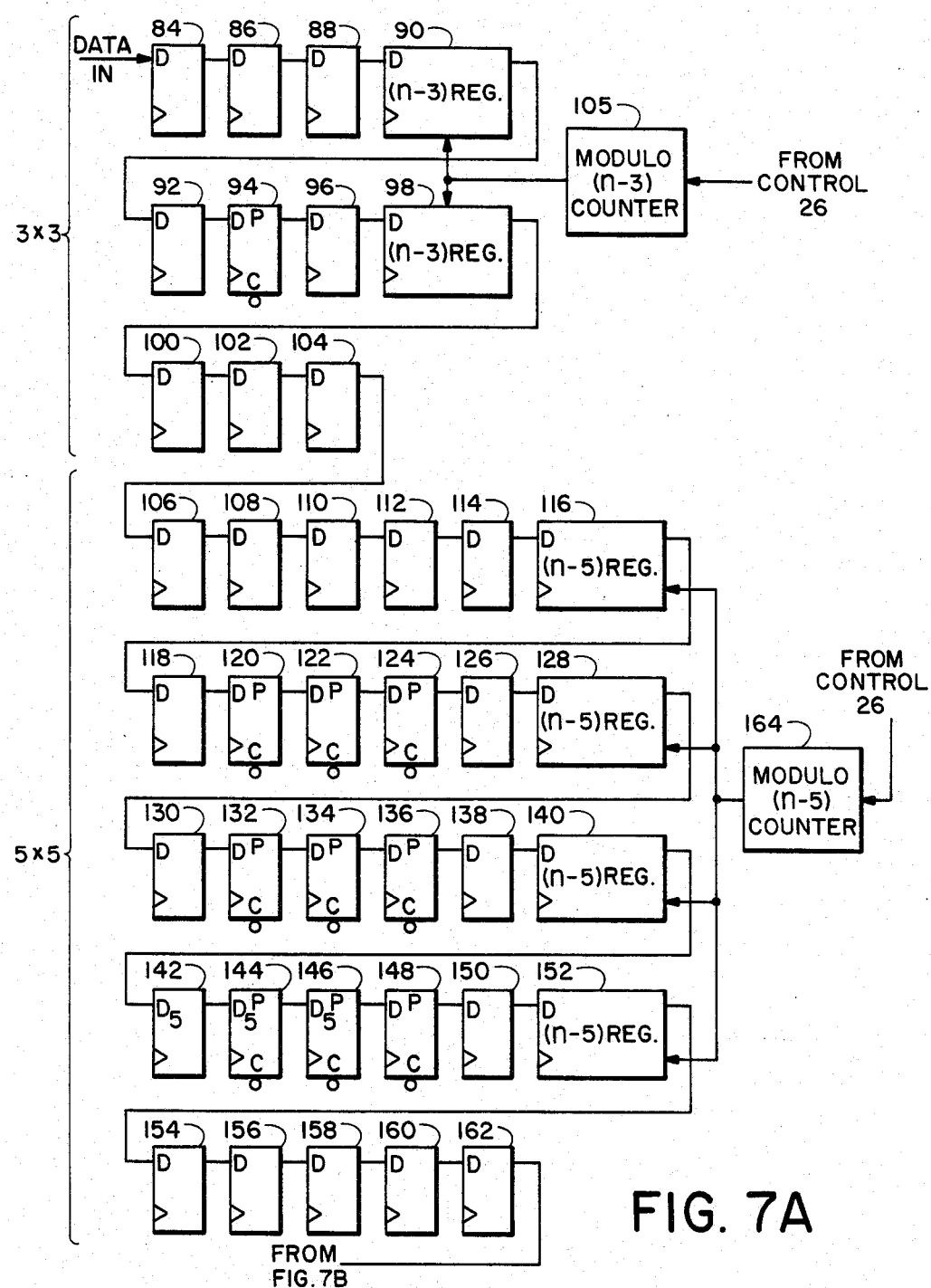
FIG. 7 shows a more complete block diagram of the circuit of FIG. 4.
Figure 7B:
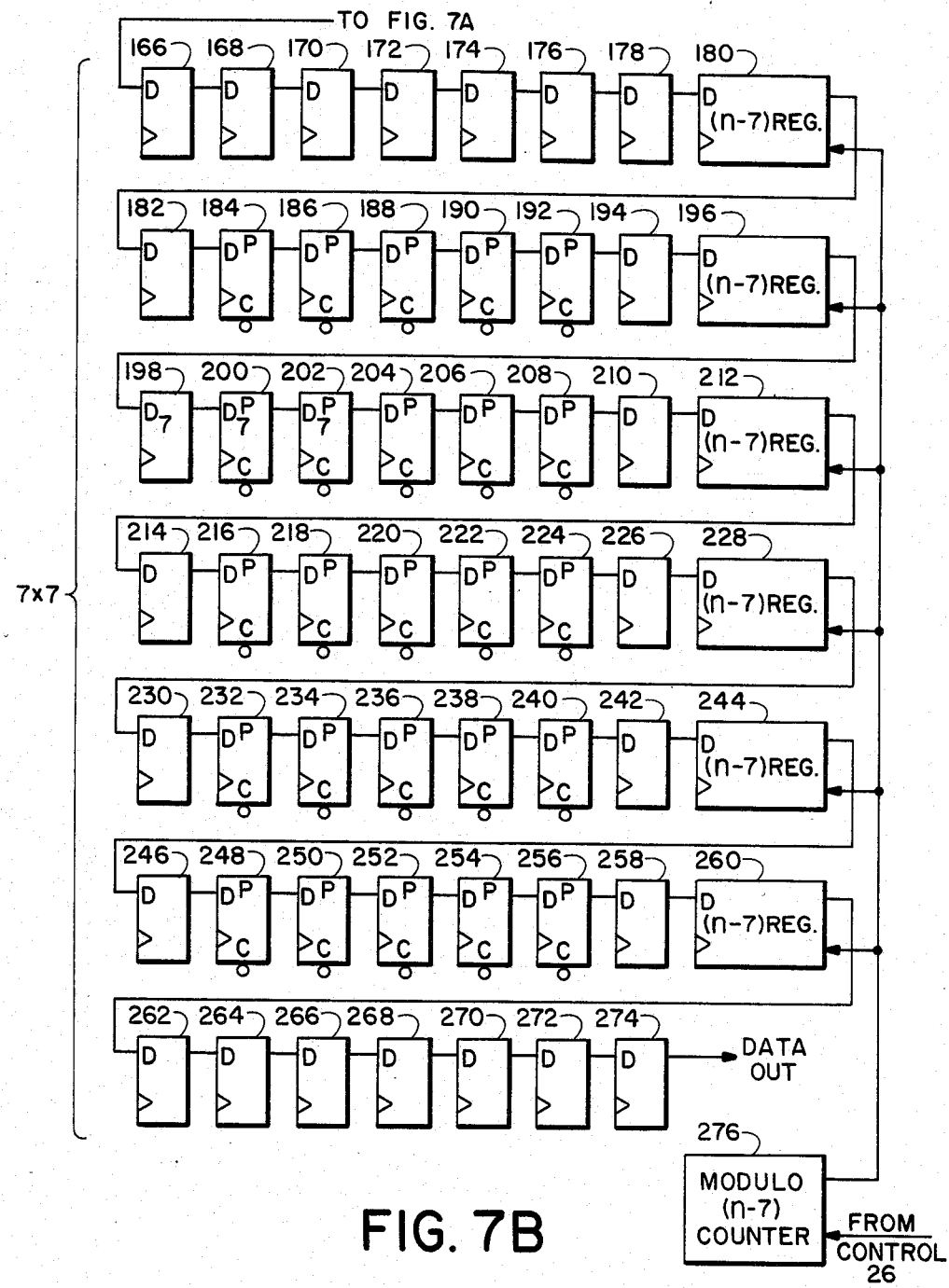
Figure 7C:
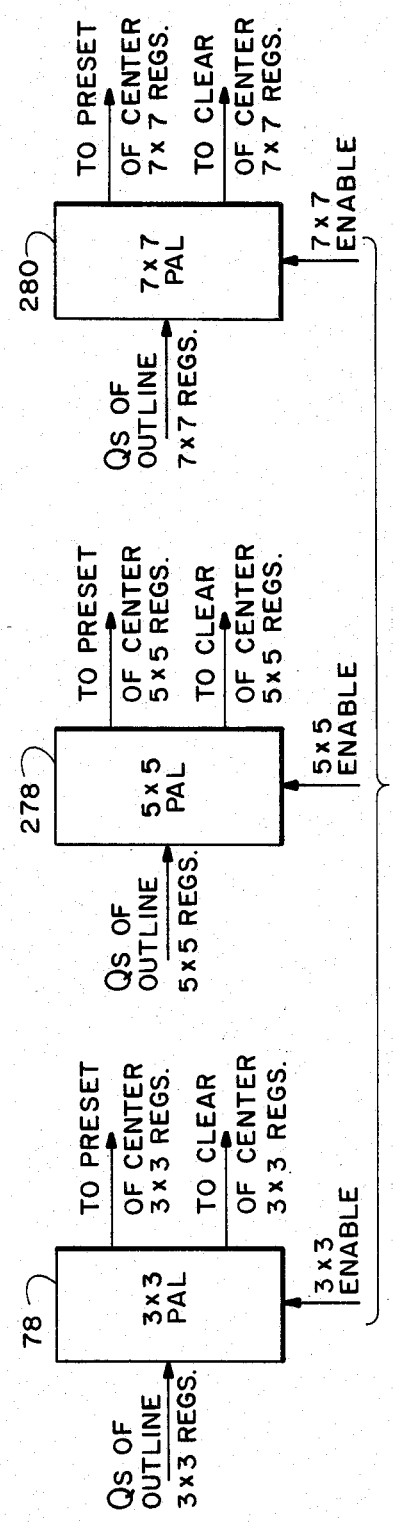

Referring now to FIG. 7, the interconnection of dot-void correction circuits 70, 72 and 74 of FIG. 4 is shown in detail. In the top portion of FIG. 7, the 3-pixel by 3-pixel window circuit of FIG. 6 is substantially repeated. Also shown are the 5-pixel by 5-pixel window circuit in the center and the 7-pixel by 7-pixel window circuit in the lower portions of the figure. In the 5-pixel by 5-pixel circuit, PAL 278 monitors the Q output signals of the outer ring flip-flops 106–114, 118, 126, 130, 138, 142, 150 and 154–162. If PAL 278 is enabled and determines that a correction of the central pixels is necessary, then it causes all of flip-flops 120–124, 132–136 and 144–148 to be cleared or set in the same manner as flip-flop 94 is in the 3-pixel by 3-pixel window circuit. Similarly, in the 7-pixel by 7-pixel window circuit, PAL 280 monitors the Q output signals of flip-flops 166–178, 182, 194, 198, 210, 214, 226, 230, 242, 246, 258 and 262–274. If PAL 280 is enabled and determines that a correction of the central pixels is necessary, then it causes all of flip-flops 184–192, 200–208, 216–224, 232–240 and 248–256 to be cleared or set, also in the same manner as flip-flop 94 is in the 3-pixel by 3-pixel window circuit.

In this circuit, after n is known, there is a constant delay of the data stream from when a bit is first applied to flip-flop 84 and it exits flip-flop 274 independent of whether any one of all of PAL's 78, 278 and 280 are enabled. This constant delay then can be utilized in the timing of subsequent hardware or software operations on the data stream after it exits flip-flop 274.

Several variations in the combined circuits of FIG. 7 are possible without changing the performance of the circuit. One variation is the combination of the last row of flip-flops of one window circuit with the first row of flip-flops of the subsequent window circuit. For example in the circuits of FIG. 7, flip-flops 100–104 can be deleted and the Q output signals from flip-flops 106–110 coupled to PAL 78 to complete the function of the 3-pixel by 3-pixel window circuit. Similarly, flip-flops 154–162 can be deleted and the Q output signals from flip-flops 166–174 coupled to PAL 278 to complete the function of the 5-pixel by 5-pixel window.

Another variation of the circuit of FIG. 7 is an extension of the first variation, namely the provision of thirteen rows of seven cascaded D flip-flops followed by an (n−7) variable length register in all but the last row. In the circuit of this variation, only modulo (n−7) arithmetic is necessary, thus a single modulo (n−7) counter is needed to control each of the variable length register. The 3-pixel by 3-pixel window can be defined by any three consecutive flip-flops in each of the first three rows of flip-flops with the delay time between the first and second rows of three flip-flops equal to the delay time between the second and third rows of three flip-flops. The input and output signals to and from PAL 78 would be coupled from or to these flip-flops as discussed in FIGS. 6 and 7.

The 5-pixel by 5-pixel window circuit in that structure, similarly, can be defined by any five consecutive flip-flops in each of the third through seventh rows of flip-flops with the time delay between adjacent rows of five flip-flops being equal to the time delay between any other adjacent rows of five flip-flops. Finally, the 7-pixel by 7-pixel window will remain as shown in FIG. 7.

Figure 8:
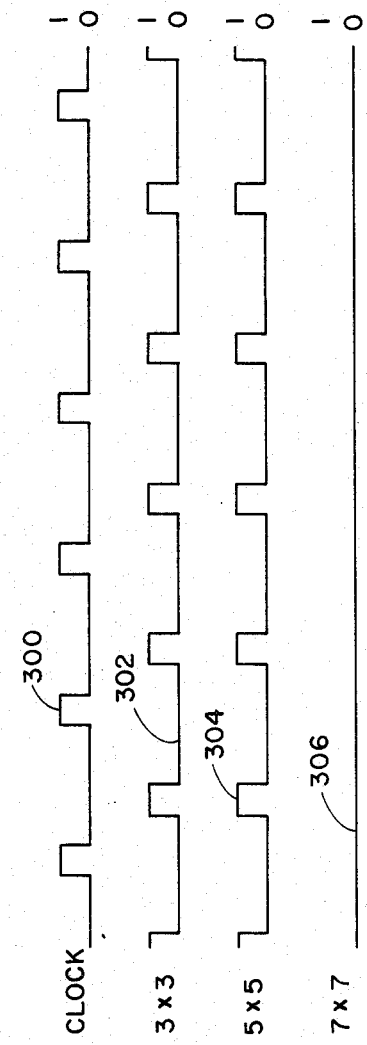
FIG. 8 shows a timing diagram of the relationship between several of the signals of the circuits of the present invention.

Referring now to FIG. 8, the relationship between the clock signal 300 to each of the flip-flops in each of the window circuits and the enable signals 302–306 to the corresponding PAL 78, 278 and 280 is shown. In FIG. 8 it is shown that the 3-pixel by 3-pixel and the 5-pixel by 5-pixel windows have been enabled by signals 302 and 304, and the 7-pixel by 7-pixel window has not. The delay between the PAL enable signals 302 and 304 from the clock signal 300 is provided to allow each of the multitude of flip-flops in the cascaded arrangement shown in FIG. 7 to assume their next state before each window, if enabled, tests and corrects for an unwanted dot or void if enabled.

While this invention has been described in terms of one preferred embodiment with two variations thereon, it is contemplated that persons reading the preceding descriptions and studying the drawings will realize various alterations and modifications thereof. It is therefore intended that the following appended claims be interpreted as including all such alterations and modifications as fall within the true spirit and scope of the present invention.

What is claimed is:

1. A method for removing representations of undesired drawing artifacts in the form of dots and voids which are smaller than the smallest designated information element size in a drawing from serial digitized data of a raster-scanned image of the drawing prior to storage of a bit-map of that digitized data representation of the image with each bit representing the digitized data value of a single pixel position of the drawing, said method comprising the steps of:

a. defining a window of data from the serial digitized data with the window having representative dimensions which are no larger than the smallest designated information element size and no smaller than three pixels by three pixels;

b. comparing the data values of each of the bits which represent the outermost ring of pixels of the window defined in step a. with each other;

c. changing the data value of all of the bits of the serial digitized data which represent the interior pixels of the window of step a. to the data value of the outermost ring of pixels when each of the pixels in the outermost ring have the same data value as each other; and d. repeating steps a. through c. M times for progressively larger windows, where M is zero or any positive integer, utilizing the serial digitized data of step c. as changed from the previous window.

2. A method as in claim 1 further includes the step of:

e. repeating steps a. through d. with overlapping windows to cover the entire drawing as the serial digitized data is received.

3. An apparatus for removing representations of undesired drawing artifacts in the form of dots and voids which are smaller than the smallest designated information element size in a drawing from serial digitized data of a raster-scanned image of the drawing prior to storage of a bit-map of that digitized data representation of the image with each bit representing the digital data value of a single pixel position of the drawing, said apparatus comprising:

a plurality of window means, cascaded one with the other, for defining increasingly larger windows of data from the serial digitized data with each window having representative dimensions which are no larger than the smallest designated information element size and no smaller than three pixels by three pixels; and a plurality of removal means, each being matched and coupled to a different one of said plurality of window means, each for comparing the data values of each of the bits which represent the outermost ring of pixels of the window defined by the corresponding window means with each other, and changing the data value of all of the bits which represent the interior pixels of the window defined by the corresponding window means to the data value of the outermost ring of pixels when the data value of each pixel of the outermost ring of pixels of that window has the same data value as each other;

wherein the changed serial digitized data from the previous window means is applied to the next window means.

4. Apparatus as in claim 3 wherein;

each window means includes memory means for storing the data value of K adjacent pixels in L adjacent rasters where K and L are positive integer values of three or greater, and where the K-pixel by L-pixel window is no larger than the size of the smallest designated information element size, and in each larger window means K and L are positive integer values at least one of which is at least one larger than the corresponding K and L value of the preceeding smaller window.

5. Apparatus as in claim 4 where each of said removal means includes:

first gating means having $2K+2(L-2)$ input terminals coupled, one to one, to the output signal terminals of the $2K+2(L-2)$ outer ring of memory means of the K-pixel by L-pixel window defined by the memory means of the corresponding window means, and having an output terminal connected to the $(K-2)$ times $(L-2)$ memory means interior to the outer ring of memory means for setting the data value stored in ech of interior memory means to a first data value when the data value stored in all of the ring memory means is also of the first data value; and second gating means having $2K+2(L-2)$ input terminals coupled, one to one, to the output signal terminals of the $2K+2(L-2)$ outer ring of memory means of the K-pixel by L-pixel window defined by the memory means of the corresponding window means, and having an output terminal connected to the $(K-2)$ times $(L-2)$ memory means interior to the outer ring of memory means for resetting the data value stored in each of interior memory means to a second data value when the data value stored in all of the ring memory means is also of the second data value;

wherein each K and L value corresponds to the K and L value of the corresponding window means.

6. Apparatus as in claim 4 where each of the memory means includes:

$(L-1)$ cascaded raster memory units, each raster memory unit including:

K cascaded flip-flops; and an $(N-K)$, register following the Kth flip-flop, N being a positive integer equal to the number of pixels in a single raster of the drawing; and a short cascaded raster memory following the $(L-1)$st cascade raster memory unit, said short cascaded raster memory unit including K cascaded flip-flops;

wherein each K and L value corresponds to the K and L value of the corresponding window means.

7. Apparatus as in claim 6 whrein the comparing means includes a PAL.

* * * * *